United States Patent

[11] 3,619,051

[72] Inventor Norman H. Wright
San Clemente, Calif.
[21] Appl. No. 868,716
[22] Filed Oct. 23, 1969
[45] Patented Nov. 9, 1971
[73] Assignee Norman Wright Productions, Inc.
Laguna Niguel, Calif.

[54] PRODUCTION OF COLOR FILMS FROM MONOCHROMATIC FILM
8 Claims, 8 Drawing Figs.

[52] U.S. Cl. .......... 355/32, 352/45, 352/50, 352/87, 355/77
[51] Int. Cl. .......... G03b 27/76
[50] Field of Search .......... 355/77, 32; 352/45, 50, 87

[56] References Cited

UNITED STATES PATENTS 3,301,626 1/1967 Maurer .......... 352/45 X

*Primary Examiner*—Samuel S. Matthews
*Assistant Examiner*—Richard A. Wintercorn
*Attorney*—Miketta, Glenny, Poms and Smith

ABSTRACT: Relates to a method of converting exposed and developed monochromatic motion picture strip film (generally of live action) into colored versions thereof. Method includes the steps of projecting and enlarging frames of the monochromatic strip film to produce enlarged images of each frame in step by step succession; a plurality of transparent cells are produced for each frame so projected, each cell carrying a different color, each color being correlated to a selected image component of the projected and enlarged frame and the placement of the component therein; colored cells for each frame are them assembled in superimposed relation and photographed on unexposed color film, the original monochromatic live action film being between the assembled cells and the color film, the monochromatic master imparting detail and shading to and outlining areas of color in the color impressions received from the cells by the color film. Various types of color film and cell paints can be employed.

INVENTOR.
NORMAN H. WRIGHT
BY
Mikesell, Glenny, Pons & Smith
ATTORNEYS.

INVENTOR.
NORMAN H. WRIGHT
By
Miketta, Glenny, Poms & Smith
ATTORNEYS.

PRODUCTION OF COLOR FILMS FROM MONOCHROMATIC FILM

Motion picture studios and other depositories are filled with monochromatic motion picture films taken in the past, such films having great value both from the standpoint of entertainment and education, but unsuited for present-day commercial use because they are monochromatic and not in color. To the best of applicant's knowledge, no simple, relatively inexpensive method has been devised heretofore whereby such exposed and developed monochromatic motion picture films can be converted into colored versions thereof.

The present invention is directed to a method of so converting monochromatic motion picture films into new editions or colored versions without the use of complicated equipment. Generally stated, the present invention relates to a method which includes the steps of projecting a live action monochromatic motion picture film, frame by frame, each projection producing an enlarged image of the frame upon a transparent cell. A plurality of transparent cells is produced for each frame so projected, each cell carrying a different color, each color being correlated to a selected component of the projected and enlarged image and its placement within the frame of the image. After such cells have been made for each frame of the master monochromatic film, the colored cells for a given frame are assembled in superimposed relation and photographed upon unexposed color film. However, during each photographic step, the given frame of the master monochromatic film is interposed between the cells and the color film so that the monochromatic film imparts detail and shading to the color impressions received from the cells by the color film.

The master color film so produced may be either negative or positive depending upon whether the monochromatic film was a negative or a positive; various types of color film may be employed, namely, either a reversal material which is processed to produce a positive or a nonreversal film which may yield either a negative or a positive, depending on how it is employed. The coloring material applied to the cells may be either opaque or capable of transmitting colored light and therefore, in the photographing step, light may be reflected from the cells or transmitted through the cells. The finished or master color film so produced is not a cartoon character since live action masters are used and at no time is it necessary to paint outlines around the particular components to which a color is applied.

An object of the present invention therefore is to disclose and provide a simple and inexpensive method of converting exposed, developed monochromatic motion picture strip films into colored versions thereof.

A further object of the invention is to disclose and provide a simple method whereby color may be imparted to previously exposed and developed monochromatic films by the use of simple, relatively well-known techniques and equipment.

These and other objects and advantages of the present invention will become apparent to those skilled in this art from the following more detailed description which will refer to the appended drawings for the purpose of illustrating exemplary forms and, in such drawings.

Figure 4:
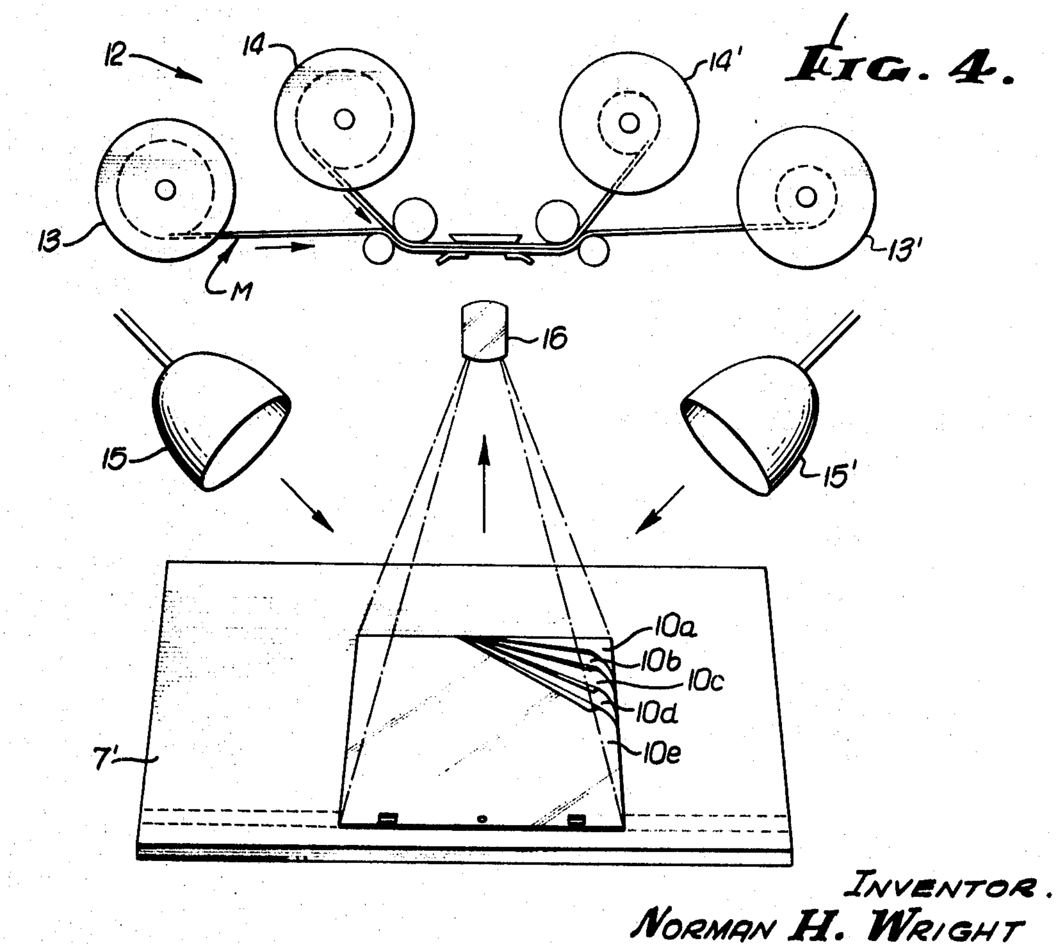

FIGS. 3*a*, 3*b*, 3*c*, 3*d* and 3*e* illustrate a series of cells made by the aid of one frame of the monochromatic film;

FIG. 4 is another diagrammatic and partly perspective arrangement of equipment employed in utilizing the cells and monochromatic film in the production of a inherently colored motion picture film.

In FIG, 1, a portion of an exposed and developed live action monochromatic motion picture strip film is indicated at M, two successive frames being indicated at M10 and M11. The exemplary scene or image appearing on frame M10 includes a number of components; background components may be said to include the sky, clouds, hills and perhaps even the distant house thereon and the adjacent grain field; middle ground components may comprise the tree in the left hand portion of the image area and the foreground action may include the figure of a man and an automobile moving along the foreground road. It is to be understood that this old master film whether negative or positive in character, is either in various shades of gray (normally termed a black and white film) or it may be sepia in tone or otherwise dye-toned but only in one color. A sepia film is not a color film. The present process is directed toward a method of converting the monochromatic films into a color film which contains and is capable of exhibiting a plurality of colors and their various hues and shadings obtained by the use of the primary colors such as blue, green and yellow or cyan, magenta and yellow.

Figure 1:
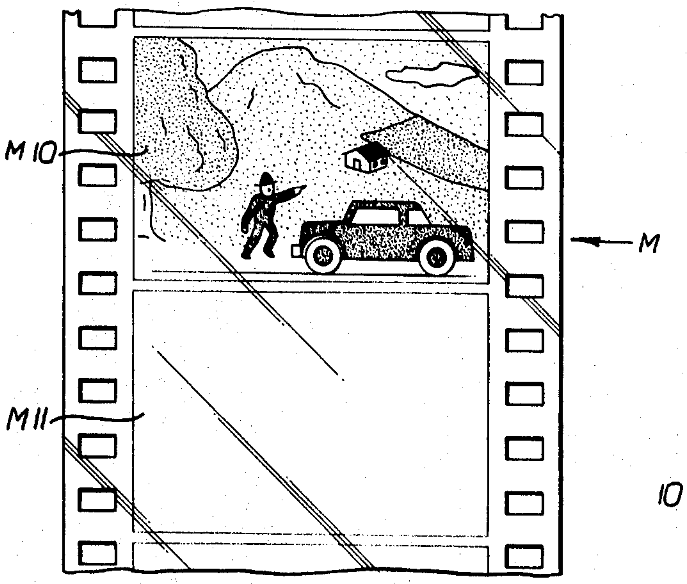
FIG. 1 is an enlarged portion of a continuous monochromatic live action motion picture film.
Figure 3A:
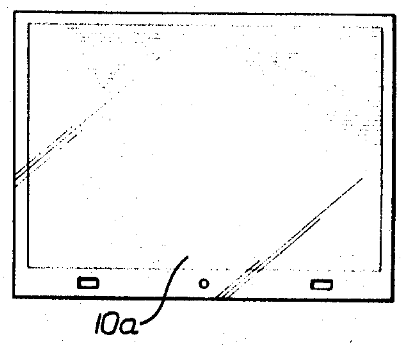
Figure 3B:
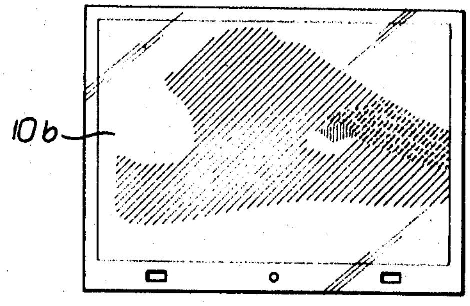
Figure 3C:
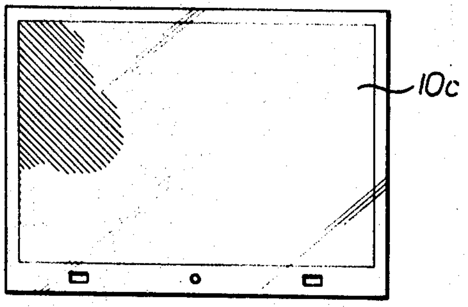
Figure 3D:
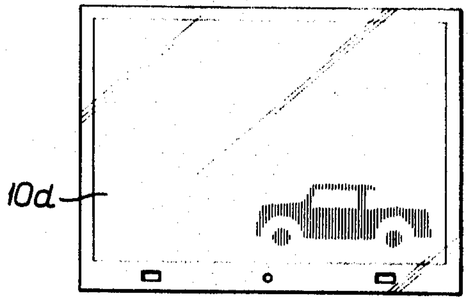
Figure 3E:
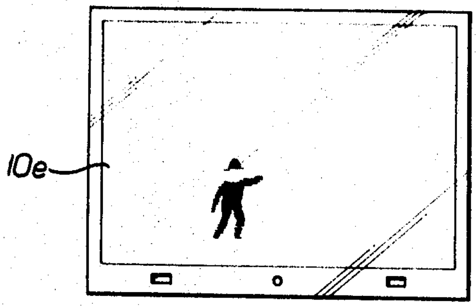
Figure 2:
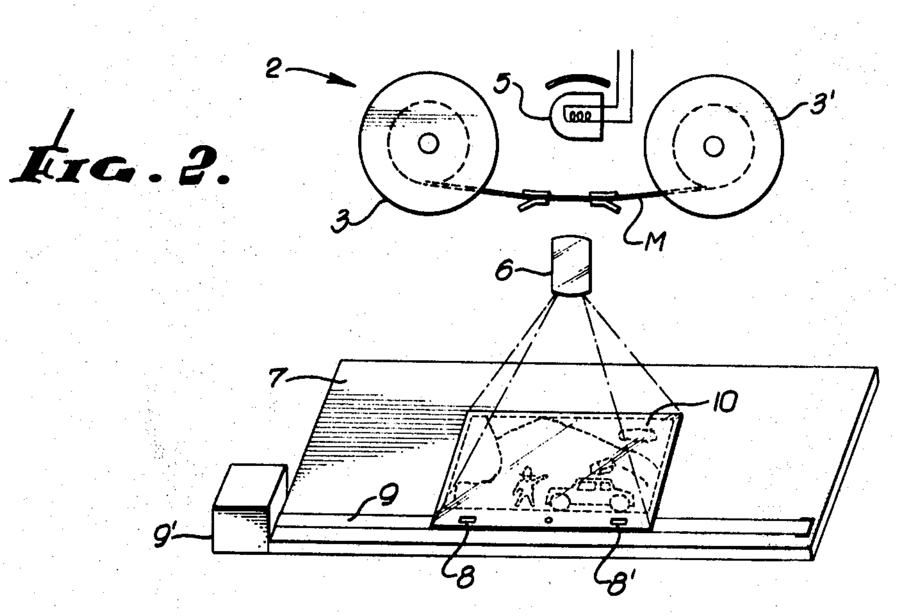
FIG. 2 is a diagrammatic and partly perspective view of an arrangement of equipment which may be used in the production of cells from the monochromatic live action film.

In the process of this invention, the primary step is that of projecting and enlarging the frames of a monochromatic live action film, frame by frame, and producing enlarged images of the picture carried by the frame of monochromatic film upon transparent cells. FIG. 2 illustrates one readily available and inexpensive arrangement of equipment for carrying out this operation. As there shown, such projector 2 may include supply and takeup reels indicated at 3 and 3′, a light source indicated at 5 and a projection lens indicated at 6. The projector includes usual means for driving the monochromatic film M through the projection aperture, such driving means including stop motion devices and arrangements whereby each frame may be individually projected in accurate registration for a sufficient length of time to permit the cell forming operations to take place.

The projector can be mounted above or below an animation bed 7 upon which means are provided for properly positioning and, if necessary, moving large precut and prepunched transparent cells made of suitable plastic so that the step of making a plurality of cells for each frame being projected is facilitated. Each cell is to carry a different color and each color should be correlated to a selected component of the projected and enlarged image and its placement within the frame of that image.

Animation beds or boards are used frequently in animated cartoon work and are well adapted for use in the instant process. Rather sophisticated arrangements of animation boards are shown in U.S. Pat, Nos. 2,198,006 and 2,281,033. In order to prevent unnecessary description, the amination board 7 illustrated is shown being provided with registry pins 8 and 8′ and means for moving the cells transversely which are generally indicated at 9, a control or drive mechanism being indicated at 9′.

Let is be assumed that the frame M10 of the film M is projected upon the cell 10 indicated in FIG. 2. It is assumed that the colors, hues and reflectance values thereof have been preestablished for each of the components. An operator then prepares a plurality of cells for the frame M10, each cell carrying a different color, each color being correlated to a selected component and placed on the cell in accordance with the position of the component by the image projected upon the cell 10 by the projector 2. For example, the operator may first prepare a cell of the background, sky and cloud exemplified by FIG. 3*a* and on the cell 10*a* there shown applies the paint having the desired blue coloration to the areas of the sky indicated by the projected image. It is to be noted that it is undesirable and unnecessary to attempt to trace the outline of the mountain; the operator simply applies blue to the area above the mountain leaving an untouched spot for the white cloud, which probably has some shadings in it as recorded on the monochromatic film being projected.

Similarly, after removing cell 10*a*, the operator places another cell 10*b* on the same registry pins 8 and 8′ and now paints in the areas covered by the mountain or hill, perhaps the field of grain and the house, using different hues or colors that have been allocated to these components. Cell 10*b* is then removed and cell 10*c* is placed in position so as to receive the image being projected and the middle ground component namely, the tree is painted a desirable shade of green in the area occupied by the projected image of such tree. It is not necessary for the operator to employ shading on the tree component nor attempt to delineate individual leaves, shadowy portions of overhanging branches or the like since all of these details will eventually be recorded on the final master color film.

Additional cells 10*d* and 10*e* are prepared in substantially the same manner, these cells being suitably colored so as to represent colors appropriate to the flesh tone of the figure, the color of its suit and the color of the car.

Similar operations are carried out on the succeeding frame M11 of the monochromatic film, but it may be possible to employ cells 10*a*, 10*b* and 10*c* and simply make new cells 11*d* and 11*e* of this frame M11 since the background and middle ground images do not change position. The above described procedure is carried out for each and every frame of the entire film, the frames of the monochromatic film being projected step by step and a record being kept of all cells that are used for each frame.

During the final operation, indicated in part in FIG. 4, the colored cells produced as above described for a given frame are assembled in superimposed relation and in registry established by the pins 8 or the like, and now photographed by a camera indicated generally at 12 having motion picture supply reels 13 and 14 and corresponding takeup reels 13' and 14'. The camera is provided with a stop motion drive, a lens 16 and a registration movement including a pressure plate at its photographic aperture.

Supply reel 14 is provided with unexposed film capable of recording color and producing colored transparencies and separations. The supply reel 13 carries the monochromatic film from which the cells have been made. It is necessary to have the monochromatic film between the color film and the cells being photographed, and as indicated in FIG. 4, it is highly desirable to place the monochromatic film in contact with the color film at the taking aperture of the camera, the emulsion sides of the two films being in contact. The camera is focused upon the assembly of cells on the table or in its field of view, such cells being illuminated by suitable light sources 15 and 15' and a frame by frame stop motion photographic series of steps now takes place. It is to be understood that when the assembly of cells 10*a* to 10*e* is being photographed, frame M10 of the monochromatic film is in position in front of the color film; after this exposure, cells 10*a* to 10*e* are removed and cells 11*a* to 11*e* are substituted, both supply and takeup reels feed such frame in series into position (this being frame M11 of the master monochromatic film) and another exposure is taken. This process is continued until all frames of the monochromatic film that are to be used in producing the new color version of the old black and white film have been photographed upon the color film. The color film can then be processed in a normal manner and be readily for use either as a positive print or as a master negative from which numerous color prints can be made.

In the above example, it has been assumed that the paints employed were opaque and light reflected from these surfaces is colored light which now passes through the master monochromatic film before it reaches the color film. Shading and detail is therefore registered upon the color film. In the event transparent colors had been applied to the cells, then a suitable diffused light source is placed beneath the cells arranged on the table or animation bed 7' and the transmitted light is similarly modulated by the monochromatic film before the colored light reaches the color film. In each case however, folds in clothing or faces of characters, grain of wood, leaves, etc. which were recorded on the black and white version will be recognizable in the finished color film even though a uniform paint layer was applied to the areas of the transparent cells occupied by the clothing, face, wood panel or tree during the formation of the cells. This desirable resultant, termed retention of photographic detail recorded on the monochromatic master original, is a characteristic feature of the process of this invention.

Although the above description has been directed to a very simple embodiment of the process, those familiar with the art will recognize that it is subject to many modifications. Instead of making all cells (for all image components and colors) required for a given frame of a master during continued projection of such given frame, the frames of the master can be projected in series and a series of cells of one component or color made, and the same series of frames again projected in stop motion to made another series of cells of another component or color, these operations being repeated until all necessary cells for desired components are available, whereupon cells for a given frame are combined and photographed. The colors or dyes employed may be primaries (such as magenta, cyan and yellow) whereby intermediate colors and tones can be obtained as well; these dyes or paints need not be applied to within the area delineated by the projected image of but a single component. Background components can be painted on paper or opaque materials (when reflected light is used) and may be larger than normal cells. Negative or positive masters can be used and the color film can be either of the reversal or nonreversal or other type. Instead of contact between the master and the color film, optical printing equipment may be used to attain the same result. The process permits great leeway in the control of light and its color. The intensity of the illumination used during photography may be controlled in accordance with the density of the master black and white so that uniform density is obtained in the color version. Color filters may also be used to vary the light employed and correct overall balance. Unusual effects may also be obtained by controlling the light during photography. For commercial television films, for example, changes from realistic coloring may be introduced in order to add emphasis. The face of an individual observing his neighbor's automobile may turn from a normal color to green, thereby portraying his envy; an automobile in the showroom may change color to illustrate the colors available from the manufacturer, while such automobile is being inspected by people whose coloring does not change; all the colors of washing on a line may change from dull to brilliant or from grey to white while the surroundings remain in their usual colors. The same sequence of forest or countryside may be depicted in colors corresponding to the various seasons of the year or as observed during stormy and bright days.

These various modifications are made available by the process to an endless number of effects, not before possible in continuous live action motion picture photography. Most important, it does permit the conversion of readily available monochromatic motion pictures to highly desirable color films for educational and commercial uses.

All changes and modifications coming within the scope of the appended claims are embraced thereby.

I claim:

1. A method of converting exposed and developed normally produced monochromatic motion picture strip film suitable for commercial exhibition into colored versions thereof, including the steps of:
   - projecting and enlarging frames of a live action monochromatic motion picture film frame by frame, to produce enlarged images thereof upon transparent cells;
   - producing a plurality of transparent cells for each frame so projected, each cell carrying a different color, each color being correlated to a selected component of the projected and enlarged image and its placement therein: without the formation of cartoonlike lines delineating the boundaries of such selected component on such cell;
   - assembling in superimposed relation the colored cells so produced for a given frame of monochromatic film; and
   - photographing the superimposed assembly of colored cells upon unexposed color film with the given frame of monochromatic film between the assembly and the color film.

2. A method as stated in claim 1 wherein the monochromatic film is in contact with the color film during the photographing step.

3. A method as stated in claim 1 wherein the colors carried by the transparent cells are opaque and said cells are illuminated by incident light during the photographing step.

4. A method as stated in claim 1 wherein the colors carried by the transparent cells are light transmitting and said cells are illuminated by transmitted light during the photographic step.

5. A method as stated in claim 3 wherein the intensity of the incident light is controlled.

6. A method as stated in claim 3 wherein the spectral character of the incident light is controlled.

7. A method as stated in claim 1 wherein the colors carried by said cells are applied evenly over the area of the correlated component as indicated by the image projected upon the cells and the limits of said area are not delineated by thin, visible lines.

8. A method as stated in claim 1 wherein the monochromatic film between the cells and color film modulates light during the photographic step and imparts shading, supplies detail and modifies the hues of the colors photographed upon the color film.

* * * * *